US006958847B2

(12) United States Patent
Lin

(10) Patent No.: US 6,958,847 B2
(45) Date of Patent: Oct. 25, 2005

(54) STRUCTURE OF AN OPTICAL INTERFERENCE DISPLAY UNIT

(75) Inventor: Wen-Jian Lin, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 30 days.

(21) Appl. No.: 10/807,143

(22) Filed: Mar. 24, 2004

(65) Prior Publication Data

US 2005/0157364 A1 Jul. 21, 2005

(30) Foreign Application Priority Data

Jan. 20, 2004 (TW) ................................ 93101539

(51) Int. Cl.[7] ............................................ G02B 26/00
(52) U.S. Cl. ...................... 359/295; 359/290; 359/291
(58) Field of Search .............................. 359/290–295, 359/224, 298; 445/24, 25

(56) References Cited

U.S. PATENT DOCUMENTS

| | | | | |
|---|---|---|---|---|
| 5,835,255 A * | 11/1998 | Miles | ........................ | 359/291 |
| 6,201,631 B1 * | 3/2001 | Greywall | .................... | 359/245 |
| 6,882,458 B2 * | 4/2005 | Lin et al. | .................... | 359/247 |
| 2004/0147198 A1 * | 7/2004 | Lin et al. | ...................... | 445/24 |
| 2005/0068605 A1 * | 3/2005 | Tsai | .......................... | 359/290 |

* cited by examiner

*Primary Examiner*—Georgia Epps
*Assistant Examiner*—M. Hasan
(74) *Attorney, Agent, or Firm*—Hoffman, Wasson & Gitler, P.C.

(57) ABSTRACT

An optical interference display unit, at least comprises a light-incidence electrode and a light-reflection electrode located on a transparent substrate. The light-incidence electrode at least comprises a transparent conductive layer and a dielectric layer. The light-reflection electrode at least comprises an absorption layer and a reflective layer.

17 Claims, 2 Drawing Sheets

STRUCTURE OF AN OPTICAL INTERFERENCE DISPLAY UNIT

FIELD OF INVENTION

The present invention relates to an optical interference display panel, and more particularly, the present invention relates to a color changeable pixel unit for an optical interference display panel.

BACKGROUND OF THE INVENTION

Planar displays have great superiority in the portable display device and limited-space display market because they are lightweight and small. To date, in addition to liquid crystal displays (LCD), organic electro-luminescent displays (OLED), and plasma display panels (PDP), a mode of optical interference display is another option for planar displays.

U.S. Pat. No. 5,835,255 discloses an array of optical interference display units of visible light that can be used as a planar display. Referring to FIG. 1, FIG. 1 illustrates a cross-sectional view of a conventional optical interference display unit. Every optical interference display unit 100 comprises a light-incidence electrode 102 and a light-reflection electrode 104 formed on a transparent substrate 105. The light-incidence electrode 102 and the light-reflection electrode 104 are supported by supporters 106, and a cavity 108 is subsequently formed therebetween. The distance between the light-incidence electrode 102 and the light-reflection electrode 104, that is, the length of the cavity 108, is D. The light-incidence electrode 102 is a semi-transmissible/semi-reflective layer with an absorption rate that partially absorbs visible light. The light-reflection electrode 104 is a light reflective layer that is deformable when voltage is applied. The light-incidence electrode 102 comprises a transparent conductive layer 1021, an absorbing layer 1022, and a dielectric layer 1023. When the incident light passes through the light-incidence electrode 102 and into the cavity 108, in wavelengths ($\lambda$) of all visible light spectra of the incident light, only visible light with a wavelength $\lambda_1$ corresponding to formula 1.1 can generate a constructive interference and can be emitted, that is, $$2D=N\lambda \tag{1.1}$$

where N is a natural number.

When the length D of the cavity 108 is equal to half of the wavelength multiplied by any natural number, a constructive interference is generated and a sharp light wave is emitted. In the meantime, if an observer follows the direction of the incident light, a reflected light with wavelength $\lambda_1$ can be observed. Therefore, the optical interference display unit 100 is "open".

FIG. 2 illustrates a cross-sectional view of a conventional optical interference display unit after a voltage is applied. Referring to FIG. 2, while driven by the voltage, the light-reflection electrode 104 is deformed and falls down towards the light-incidence electrode 102 due to the attraction of static electricity. At this time, the distance between the light-incidence electrode 102 and the light-reflection electrode 104, that is, the length of the cavity 108, is not exactly equal to zero, but is d, which can be equal to zero. If D in formula 1.1 is replaced with d, only visible light with a wavelength $\lambda_2$ satisfying formula 1.1 in wavelengths $\lambda$ of all visible light spectra of the incident light can generate a constructive interference, be reflected by the light-reflection electrode 104, and pass through the light-incidence electrode 102. Because the light-incidence electrode 102 has a high light absorption rate for light with wavelength $\lambda_2$, all the incident light in the visible light spectrum is filtered out and an observer who follows the direction of the incident light cannot observe any reflected light in the visible light spectrum. Therefore, the optical interference display unit 100 is now "closed".

The light-incidence electrode 102 is a semi-transmissible/semi-reflective electrode. When the incident light passes through the light-incidence electrode 102, a portion of the intensity of the light is absorbed by the absorbing layer 1022. The transparent conductive layer 1021 can be formed from transparent conductive materials such as indium tin oxide (ITO) and indium-doped zinc oxide (IZO). The absorbing layer 1022 can be formed from metals such as aluminum, chromium and silver. The dielectric layer 1023 can be made of silicon oxide, silicon nitride or metal oxide which can be formed by directly oxidizing a portion of the absorbing layer 1022. The light-reflection electrode 104 is a deformable reflective electrode that can move upwards and downwards depending on the applied voltage. The light-reflection electrode 104 is formed from a reflection layer made of metal/transparent conductive material and a mechanical stress adjusting layer. Typical metals used in forming the reflection layer include silver and chromium. However, silver has a low stress, and chromium has a high stress but the reflectivity thereof is quite low. Therefore, there exists a need to use a highly reflective metal to form the reflection layer and a high stress metal to form the mechanical stress adjusting layer thereby allowing the light-reflection electrode 104 to become a displaceable and reflective electrode.

The display apparatus formed from the array of optical interference display units of visible light is Bi-Stable and is characterized by having low power consumption and much shorter response time. Therefore, it can be used as a display panel and is especially suitable for use in portable equipment such as mobile phone, PDA, portable computer, and so on.

SUMMARY OF THE INVENTION

In the conventional manufacturing process of the optical interference display unit, an indium tin oxide (ITO) layer is formed on a transparent substrate, a metal light absorbing layer is formed on the ITO layer, and then a dielectric layer is formed on the metal light absorbing layer. Since there exists a large amount of hetero-atoms (such as oxygen, nitrogen, etc.) in both ITO and dielectric layer forming process, the metal absorbing layer must be formed in another reaction chamber thereby preventing contamination of the hetero-atoms. However, this increases the complexity of the process.

Accordingly, an objective of the present invention is to provide a method for fabricating an optical interference display unit wherein the light absorbing layer on the light-incidence electrode is removed such that the light-incidence electrode can be formed in the same deposition reaction chamber.

Another objective of the present invention is to provide an optical interference display unit wherein the light absorbing layer is disposed above the light-reflection electrode to prevent contamination of the hetero-atoms thereby achieving stable quality and high process yield.

Another objective of the present invention is to provide an optical interference display unit wherein the light-reflection electrode is comprised of a light absorbing layer and a light reflection layer such that the mechanical stress adjusting layer can be skipped to simplify the process, reduce costs and increase process yield.

According to the aforementioned objectives of the present invention, one preferred embodiment of the present invention provides a method for fabricating an optical interference display unit. In this method, a transparent conductive layer and an optical film are formed on a transparent substrate 301 in sequence so as to form a light-reflection electrode wherein the optical film can be a dielectric layer. After a sacrificial layer is formed on the optical film, openings are formed in the light-reflection electrode and the sacrificial layer wherein each of the openings is suitable for forming a supporter therein. Then, a first photoresist layer is spin-coated on the sacrificial layer to fill up the openings. The photoresist layer is patterned by a photolithography process to define the supporters. The material of the sacrificial layer can be opaque materials such as metal or common dielectric materials.

A light absorbing layer and a light reflection layer are formed on the sacrificial layer and the supporters in sequence so as to form a light-reflection electrode. Finally, the sacrificial layer is removed by a structure release etching process thereby obtaining an optical interference display unit.

The optical interference display unit formed by the aforementioned process at least comprises a light-incidence electrode and a light-reflection electrode formed on a transparent substrate. The light-incidence electrode and the light-reflection electrode are supported by supporters, and a cavity is subsequently formed therebetween. The light-incidence electrode is comprised of a transparent conductive layer and a dielectric layer. The light-reflection electrode is comprised of an absorption layer and a reflective layer.

When light enters from the light-incidence electrode, it passes through the transparent substrate, the transparent conductive layer and the optical film, and directly reaches the light absorbing layer that absorbs a portion of the light (approximately 30%) thereby reducing the intensity of the incident light. Then, the incident light is reflected from the reflective layer of the reflection electrode. When the length of the cavity remains constant, only visible light with a wavelength $\lambda_1$ corresponding to formula 1.1 can be emitted from the optical interference display unit through the light-incidence electrode and then observed by an observer.

Rather than arranging the light absorbing layer in a conventional way, i.e., on the light-incidence electrode, the light absorbing layer is disposed on the light-reflection electrode in the optical interference display unit of the present invention. Moreover, when the conventional structure of the light-incidence electrode (i.e., a transparent conductive layer, a light absorbing layer and an optical film) is adopted, since the light absorbing layer is typically a very thin metal layer with a thickness less than 100 angstroms, even a low level of contamination, e.g., by the hetero-atoms generated in transparent conductive layer and optical film forming process, can adversely affect the thickness uniformity and the quality stability of the light absorbing layer a great deal. Therefore, the manufacturing process must be performed in two reaction chambers and said three films must be formed in the two reaction chambers alternately. Even though it is conducted in the aforementioned way, the metal absorbing layer with a very small thickness is still unavoidably affected by the preceding and the subsequent processes thereby adversely affecting the quality thereof slightly.

However, in the optical interference display unit of the present invention, a sacrificial layer with a thickness of several micrometers to tens of micrometers is formed after the transparent conductive layer and the optical film are formed in sequence. Typically, the material of the sacrificial layer can be metal or silicon materials. The light absorbing layer is formed on the sacrificial layer and the supporters after the supporters are formed. Finally, the light reflection layer is formed. Since the sacrificial layer is thick enough to prevent contamination of the hetero-atoms generated in transparent conductive layer and optical film forming process, a light absorbing layer of very good uniformity and quality can be obtained even though the light absorbing layer has a thickness of only tens to hundreds of angstroms. Moreover, the sacrificial layer will be removed eventually thereby having no effect upon the light absorbing layer and the light reflection layer.

In addition, the mechanical stress of the light absorbing layer can be increased by adjusting the process parameters of the light absorbing layer forming step, e.g., reducing the applied power or the film-forming velocity in the metal deposition process. Therefore, the light absorbing layer can have the function of the mechanical stress adjusting layer that is optional in the present invention. The process parameters of the light absorbing layer forming step depend on the material and the thickness of the light reflection layer and the light absorbing layer.

The advantages of the optical interference display unit fabricated by the method provided in the present invention are listed as follows. Firstly, the manufacturing steps are simplified and the probable contamination is avoided such that the manufacturability of the optical interference display unit is increased and the resultant panel has a more stable characteristic and a better quality. Secondly, since the light absorbing layer can function as the mechanical stress adjusting layer, the mechanical stress adjusting layer is not required in practicing the present invention.

BRIEF DESCRIPTION OF THE DRAWINGS

These and other features, aspects, and advantages of the present invention will be more fully understood by reading the following detailed description of the preferred embodiment, with reference made to the accompanying drawings as follows.

DETAILED DESCRIPTION OF THE PREFERRED EMBODIMENT

In order to make the illustration of the optical interference display unit provided in the present invention more clear, a detailed description of the optical interference display unit and the manufacturing method thereof disclosed in the present invention is set forth in a preferred embodiment.

EXAMPLE

Figure 1:
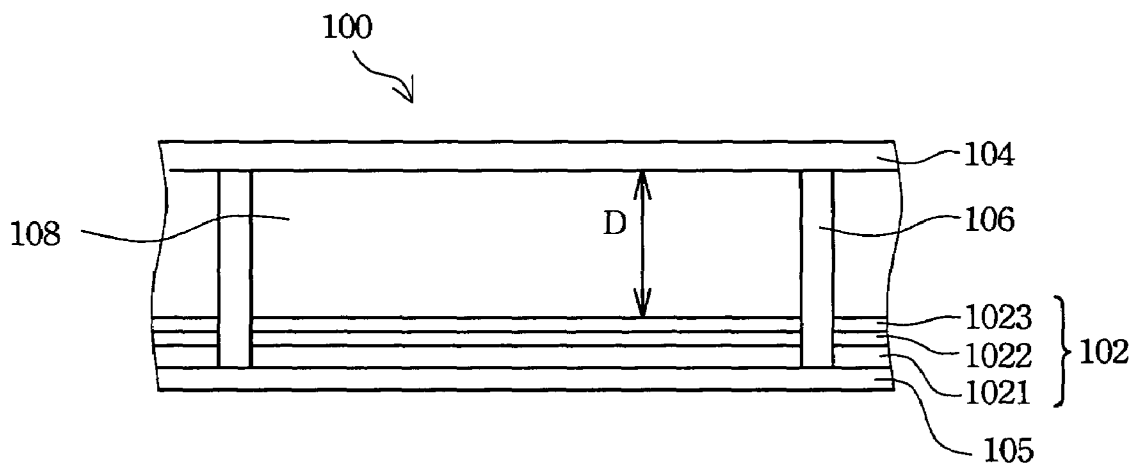
FIG. 1 illustrates a cross-sectional view of a conventional optical interference display unit.
Figure 2:
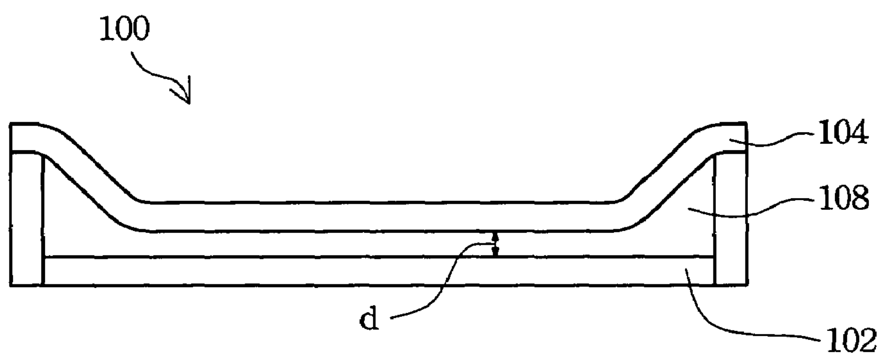
FIG. 2 illustrates a cross-sectional view of a conventional optical interference display unit after a voltage is applied.
Figure 3A:
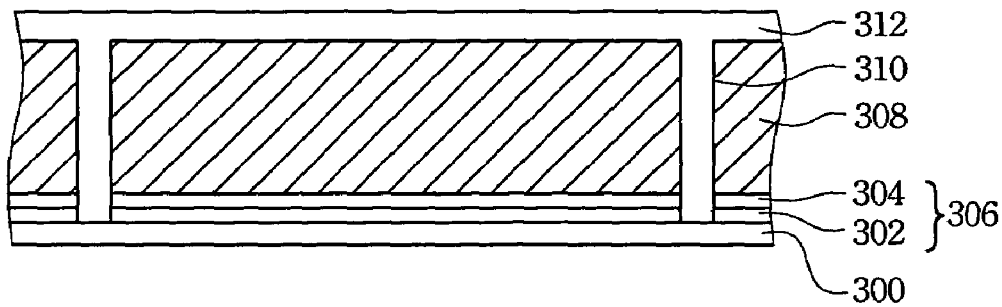
FIG. 3A to FIG. 3C illustrate a method for manufacturing an optical interference display unit in accordance with a preferred embodiment of the present invention.
Figure 3B:
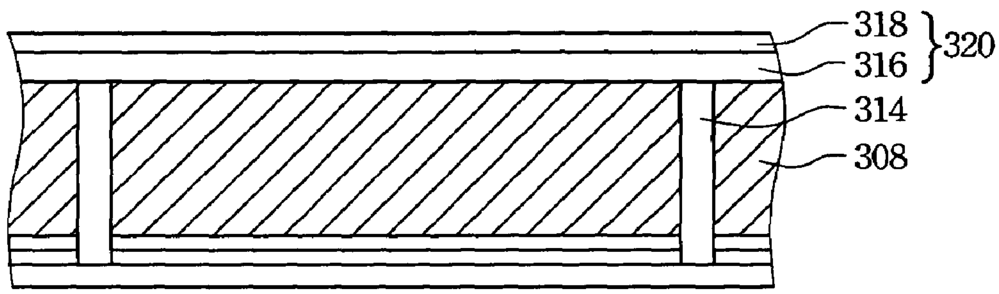
Figure 3C:
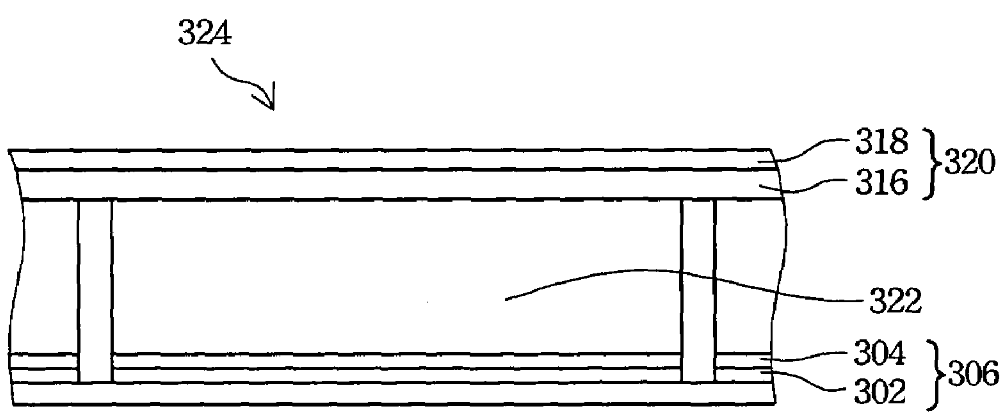

FIG. 3A to FIG. 3C illustrate a method for manufacturing an optical interference display unit in accordance with a preferred embodiment of the present invention. Referring to FIG. 3A, a transparent conductive layer 302 is formed on a transparent substrate 300. The material of the transparent conductive layer 302 can be indium tin oxide (ITO), indium-doped zinc oxide (IZO), zinc oxide (ZO), indium oxide (IO) or a mixture thereof. Thickness of the transparent conductive layer 302 is selected depending upon the requirement, but is typically tens to thousands of angstroms.

After the transparent conductive layer 302 is formed, at least one optical film 304 is formed on the transparent conductive layer 302. The material of the optical film 304 can be dielectric material such as silicon oxide, silicon nitride or metal oxide. The transparent conductive layer 302 and the optical film 304 constitute the light-reflection electrode 306. Then, a sacrificial layer 308 is formed on the optical film 304. The material of the sacrificial layer 308 can be metal or silicon materials, e.g., molybdenum metal, magnesium metal, molybdenum alloy, magnesium alloy, monocrystalline silicon, polycrystalline silicon, amorphous silicon, etc. Thickness of the transparent conductive layer 302 is selected depending upon the wavelength of light incident on the optical interference display unit, but is preferably several micrometers to tens of micrometers.

Openings 310 are formed in the light-incidence electrode 306 and the sacrificial layer 308 by a photolithography and etching process, and each of the openings 308 is suitable for forming a supporter therein.

Then, a material layer 312 is formed on the sacrificial layer 308 and fills up the openings 308. The material layer 312 is suitable for forming the supporter, and the material layer 312 generally is made of photosensitive materials such as photoresists, or non-photosensitive polymer materials such as polyester, polyamide or the like. If non-photosensitive materials are used for forming the material layer 312, a photolithographic etching process is required to define supporters in the material layer 312. In this embodiment, the photosensitive materials are used for forming the material layer 312, so merely a photolithography process is required for patterning the material layer 312. The material layer 312 shown in FIG. 3A is patterned by a photolithography process to define the supporters 314 (see FIG. 3B).

Next, a metal layer 316 is formed on the sacrificial layer 308 and the supporters 314 as a light absorbing layer. Metal suitable for use in forming the metal layer 316 includes chromium, molybdenum, chromium/molybdenum alloy, chromium alloy, molybdenum alloy, and so on. Thickness of the metal layer 316 is tens to thousands of angstroms. Thereafter, a reflective layer 318 is formed on the metal layer 316. The material of the reflective layer 318 can be metal such as silver, aluminum, silver alloy or aluminum alloy, etc. The metal layer 316 and the reflective layer 318 constitute the light-reflection electrode 320.

Referring to FIG. 3C, the sacrificial layer 308 shown in FIG. 3B is removed by a structure release etching process to form a cavity 322 located in the position of the sacrificial layer 111. The optical interference display unit 324 is formed on a transparent substrate 300 by the aforementioned process. The optical interference display unit 324 at least comprises a light-incidence electrode 306 and a light-reflection electrode 320. The light-incidence electrode 306 and the light-reflection electrode 320 are supported by supporters 314, and a cavity 322 is subsequently formed therebetween. The light-incidence electrode 306 is comprised of a transparent conductive layer 302 and an optical film 304. The light-reflection electrode 320 is comprised of a metal layer (light absorbing layer) 316 and a reflective layer 318.

In addition, if the stress structure of the light-reflection electrode 320 is desired to be reinforced, a mechanical stress adjusting layer (not shown) can be formed on the reflective layer 318 to adjust the stress of the light-reflection electrode 320.

In the present invention, the light absorbing layer conventionally arranged in the light-incidence electrode is transferred to locate in the light-reflection electrode. This structural design can simplify the manufacturing steps and prevent contamination of the light absorbing layer that is probably occurred in the process such that the manufacturability of the optical interference display unit is increased and the resultant panel has a more stable characteristic and a better quality. Furthermore, since the light absorbing layer can function as the mechanical stress adjusting layer, the mechanical stress adjusting layer is not required in practicing the present invention thereby skipping a manufacturing step. This can increase process yield and reduce costs.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structure.

What is claimed is:

1. A structure of an optical interference display unit comprising:

a light-incidence electrode including:

a transparent conductive layer; and an optical film on the transparent conductive layer;

a light-reflection electrode including:

a light absorbing layer; and a reflective layer on the light absorbing layer; and at least two supporters for supporting the light-incidence electrode and the light-reflection electrode wherein a cavity is formed between the light-incidence electrode and the light-reflection electrode.

2. The structure of an optical interference display unit according to claim 1, wherein the optical interference display unit is formed on a transparent substrate.

3. The structure of an optical interference display unit according to claim 1, wherein the material of the transparent conductive layer is selected from the group consisting of indium tin oxide, indium-doped zinc oxide, zinc oxide, indium oxide or a mixture thereof.

4. The structure of an optical interference display unit according to claim 1, wherein the optical film is a dielectric film.

5. The structure of an optical interference display unit according to claim 4, wherein the dielectric film is made of silicon oxide, silicon nitride or metal oxide.

6. The structure of an optical interference display unit according to claim 1, wherein the light absorbing layer is made of metal.

7. The structure of an optical interference display unit according to claim 6, wherein the metal is chromium, molybdenum, chromium/molybdenum alloy, chromium alloy, or molybdenum alloy.

8. The structure of an optical interference display unit according to claim 1, wherein the reflective layer is made of metal.

9. The structure of an optical interference display unit according to claim 8, wherein the metal is silver, aluminum, silver alloy or aluminum alloy.

10. The structure of an optical interference display unit according to claim 1, wherein the light-reflection electrode further comprises a mechanical stress adjusting layer on the reflective layer.

11. A structure of an optical interference display unit comprising:

a light-incidence electrode including:

a transparent conductive layer; and a dielectric layer on the transparent conductive layer;

a light-reflection electrode including:

a metal layer; and a reflective layer on the metal layer;

a mechanical stress adjusting layer on the reflective layer; and at least two supporters for supporting the light-incidence electrode and the light-reflection electrode wherein a cavity is formed between the light-incidence electrode and the light-reflection electrode.

12. The structure of an optical interference display unit according to claim 11, wherein the optical interference display unit is formed on a transparent substrate.

13. The structure of an optical interference display unit according to claim 11, wherein the material of the transparent conductive layer is selected from the group consisting of indium tin oxide, indium-doped zinc oxide, zinc oxide, indium oxide or a mixture thereof.

14. The structure of an optical interference display unit according to claim 11, wherein the dielectric layer is made of silicon oxide, silicon nitride or metal oxide.

15. The structure of an optical interference display unit according to claim 11, wherein the metal layer is made from chromium, molybdenum, chromium/molybdenum alloy, chromium alloy, or molybdenum alloy.

16. The structure of an optical interference display unit according to claim 11, wherein the reflective layer is made of metal.

17. The structure of an optical interference display unit according to claim 16, wherein the metal is silver, aluminum, silver alloy or aluminum alloy.

* * * * *